May 11, 1943.   F. G. BOUCHER   2,318,665
MEASURING DEVICE
Filed Feb. 7, 1941

Frank G. Boucher INVENTOR.
BY P. J. Whelan
ATTORNEY

Patented May 11, 1943

2,318,665

UNITED STATES PATENT OFFICE 2,318,665

MEASURING DEVICE

Frank G. Boucher, Tulsa, Okla., assignor to Standard Oil Development Company, a corporation of Delaware Application February 7, 1941, Serial No. 377,817

4 Claims. (Cl. 265—1.4)

The present invention is directed to means for measuring the force required to restore a torsional system to null position, and has particular reference to gravity meters in which the moving system including the mass is supported by torsional springs.

A particular object of the present invention is to provide a device of the character described in which a large number of turns or a large movement of an indicating means is required to restore the system proper to null position after it has moved from null position by a minute amount. That is to say, the principal object of this invention is the provision of an extremely sensitive null restoring device.

Figure 1:
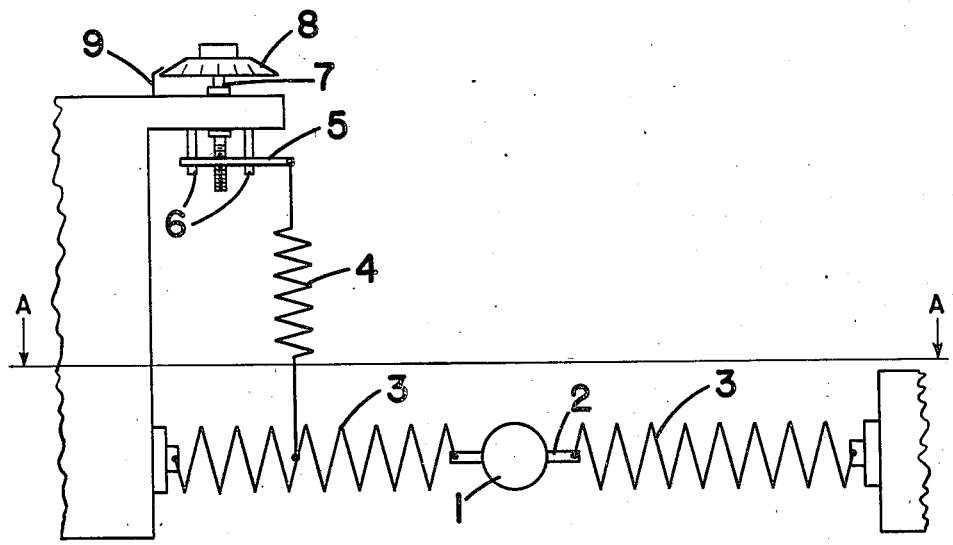
Figure 2:
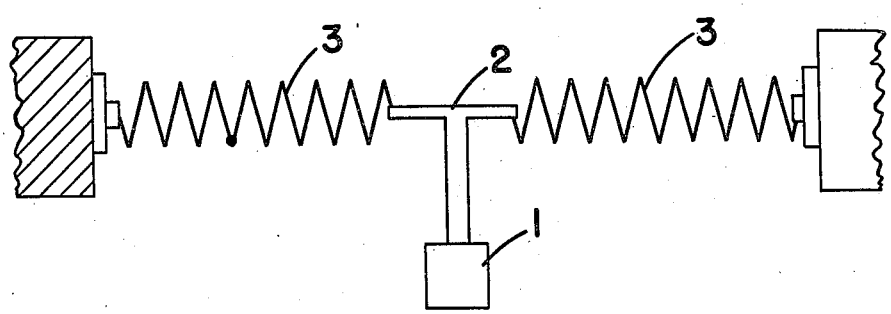

Other objects and advantages of the present invention will appear from the following detailed description of the accompanying drawing in which Fig. 1 is a side elevation of a system according to the present invention, partly in section; and Fig. 2 is a transverse section along the line A—A of Fig. 1.

Before describing the drawing in detail it will be well to point out that only the bare essentials of the system aside from the null restoring mechanism is shown because to include all the details of the moving system, such as temperature compensators, barometric compensators, adjusting screws, and the like, would make the description unduly complicated without adding anything to the essential features of the invention.

In essence, the moving system comprises a mass 1 extending laterally from a cross piece 2 to either end of which is attached a torsional spring 3. The torsional springs are anchored to opposite walls of the housing of the device. The torsion in springs 3 is so adjusted that normally the mass 1 and cross piece 2 are held in a horizontal position and will react readily to changes in force of gravity, exerting a torque on spring 3.

The novel feature of the present invention is the null restoring mechanism which consists of a spring 4 connected to one of the torsion springs 3 at a point so as to oppose the movement of the spring in response to a downward pull on the weight. It is to be observed particularly that the spring 4 is connected to a spring 3 at a point adjacent its fixed end. The reason for this is that the farther away from the cross piece 2 the spring 4 is attached to spring 3, the greater will be the force exerted by spring 4 necessary to restore the system to its null position. The other end of spring 4 is anchored to a moving block 5 which travels on pins 6 extending downwardly from the top wall of the casing. Also extending downwardly through the casing and passing through the block 5 is a screw 7 having a graduated head 8. The top of the casing is provided with a pointer 9 for reading the graduated head 8.

It will be noted that due to the location of the spring 4 any movement of weight 1 will require a large number of turns of the knob or head 8 in order to restore the system to null position. Because of this fact the percentage error is greatly reduced and the sensitivity correspondingly increased. The closer the spring 4 is attached to the anchor of spring 3, the greater will be the sensitivity of the device.

The nature and objects of the present invention having been thus described and illustrated, what is claimed as new and useful and is desired to be secured by Letters Patent is:

1. In a system for measuring a force acting torsionally on a helical torsion spring having an anchored end and an end subjected to said force, means for applying to a turn of said spring at a point closer to the anchored end than to the other end thereof a second force in opposition to said first mentioned force and means to indicate a value proportional to the amount of said second mentioned force.

2. In a system for measuring a force acting torsionally on a helical torsion spring having an anchored end and an end subjected to said force, a second spring fixed to a turn of said torsion spring in a position to oppose the force acting on said spring and at a point closer to the anchored end of said spring than to the end to which the force is applied, means for applying a force to said second spring and means to indicate a value proportional to the amount of said force.

3. A gravity meter comprising a moving system, including a hub member and a mass extending horizontally from said member, horizontally arranged helical springs extending from either side of said hub member along an axis at right angles to a line passing through the center of said mass and the center of said hub member, whereby, when said mass reacts to a change in gravity, a change in torsion is created in said springs, means for applying a force directly to a turn of one of said springs in opposition to said force of gravity in order to restore the moving system to its null position after deflection therefrom by a change in gravity, and means for detecting the force required to restore said system to its null position.

4. A gravity meter comprising a moving system including a hub member and a mass extending horizontally from said member, horizontally arranged helical springs extending from either side of said hub member along an axis at right angles to a line passing through the center of said mass and said hub member, whereby, when said mass reacts to a change in gravity, a change in torsion is created in said springs, an auxiliary spring fixed to a turn of one of said horizontal springs in a position to oppose the force acting on said spring and at a point intermediate its ends, means for applying a force to said auxiliary spring, and means to indicate a value proportional to the amount of said force.

FRANK G. BOUCHER.